United States Patent
Ishitani (10) Patent No.: US 9,440,792 B2
(45) Date of Patent: Sep. 13, 2016

(54) COMPONENT MOUNTING APPARATUS

(71) Applicant: Panasonic Intellectual Property Management Co., Ltd., Osaka (JP)

(72) Inventor: Yasuyuki Ishitani, Yamanashi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/806,320

(22) Filed: Jul. 22, 2015

(65) Prior Publication Data

US 2016/0068343 A1 Mar. 10, 2016

(30) Foreign Application Priority Data

Sep. 10, 2014 (JP) .................................. 2014-183941

(51) Int. Cl.
| | | |
|---|---|---|
| *B65G 15/10* | (2006.01) | |
| *B65G 15/12* | (2006.01) | |
| *B65G 37/00* | (2006.01) | |

(52) U.S. Cl.
CPC ............... *B65G 15/12* (2013.01); *B65G 37/00* (2013.01)

(58) Field of Classification Search
CPC ...... B65G 15/12; B65G 15/20; B65G 15/14; B65G 15/16
USPC .................................. 198/817, 466.1, 626.3
See application file for complete search history.

(56) References Cited

U.S. PATENT DOCUMENTS

| | | | | |
|---|---|---|---|---|
| 5,259,495 A | * | 11/1993 | Douglas ............. | H05K 13/0061 198/404 |
| 5,517,748 A | * | 5/1996 | Park ................... | H05K 13/0061 29/741 |
| 6,032,788 A | * | 3/2000 | Smithers ............ | H05K 13/0069 198/817 |
| 6,142,293 A | * | 11/2000 | Ozawa ............... | H05K 13/0061 198/817 |
| 6,189,674 B1 | | 2/2001 | Izumida et al. | |
| 6,769,534 B2 | * | 8/2004 | Lee .................... | H05K 13/0061 198/817 |
| 7,810,635 B2 | * | 10/2010 | Kim .................. | H01L 21/67748 198/465.1 |

FOREIGN PATENT DOCUMENTS

| | | |
|---|---|---|
| JP | 11-163595 A | 6/1999 |
| JP | 2012-59798 A | 3/2012 |

* cited by examiner

*Primary Examiner* — James R Bidwell
(74) *Attorney, Agent, or Firm* — Pearne & Gordon LLP (57) ABSTRACT

A component mounting apparatus includes a plurality of transport conveyor units that are arranged in parallel and transports boards, each transport conveyer unit including a pair of transport rails of a fixed rail and a movable rail, a fixed side transport motor that drives a fixed side transport belt provide on the fixed rail, and a movable side transport motor that drives a movable side transport belt provide on the movable rail. The fixed side transport motor is provided on a side surface of the fixed rail that faces the movable rail, and the movable side transport motor is provided on a side surface of the movable rail that faces the fixed rail. The fixed side transport motor and the movable side transport motor are arranged so as not to interfere with each other when the distance between the pair of transport rails is changed.

3 Claims, 7 Drawing Sheets

COMPONENT MOUNTING APPARATUS

CROSS-REFERENCES TO RELATED APPLICATION(S)

This application is based on and claims priority from Japanese Patent Application No. 2014-183941 filed on Sep. 10, 2014, the entire contents of which are incorporated herein by reference.

BACKGROUND

1. Field of the Invention

The present invention relates to a component mounting apparatus in which plural transport conveyor units that transport boards are arranged in parallel.

2. Description of Related Art

A component mounting apparatus that mounts a component onto a board includes a transport conveyor unit in which a distance between a pair of transport rails can be changed according to the width of the board to be transported. A transport belt that transports the board and a transport motor that drives the transport belt are provided in the transport rails (for example, see JP-A-11-163595 as Patent Literature 1). In a transport conveyor unit disclosed in JP-A-11-163595, a transport motor that drives a transport belt is individually provided outside each transport rail.

In recent years, in order to enhance productivity, a component mounting apparatus in which two transport conveyor units are adjacently arranged in parallel has been widely used (for example, see JP-A-2012-059798 as Patent Literature 2). In transport conveyor units disclosed in JP-A-2012-059798, a transport motor that is provided outside an outer transport rail simultaneously drives a transport belt of an inner transport rail and a transport belt of the outer transport rail where two transport conveyor units are adjacently arranged. Thus, it is possible to remove a transport motor to be provided outside the inner transport rail, to thereby enable the adjacent arrangement of the two transport conveyor units.

Patent Literature 1: JP-A-11-163595
Patent Literature 2: JP-A-2012-059798

SUMMARY

However, in the transport conveyor units disclosed in JP-A-2012-059798, as the transport motor to be provided outside the inner transport rail is removed, the following problem occurs. That is, the number of the transport motors is reduced to half compared with the transport conveyor units disclosed in JP-A-11-163595, and thus, driving torque of the transport belts is reduced to half. Thus, with respect to a heavy work target such as a thick and wide board or a transport carrier on which a flexible board is loaded, there is a concern that the work target is not easily transported due to insufficient driving torque of the transport belts.

Accordingly, a non-limited object of one or more embodiments of the present invention is to provide a component mounting apparatus, in which plural transport conveyor units are arranged in parallel, capable of improving insufficient driving torque of transport belts.

An aspect of the present invention provides a component mounting apparatus including: a plurality of transport conveyor units that are arranged in parallel and transports boards, each transport conveyor unit including a pair of transport rails of a fixed rail and a movable rail moving to change a distance between the pair of transport rails; a fixed side transport motor that drives a fixed side transport belt provide on the fixed rail; and a movable side transport motor that drives a movable side transport belt provide on the movable rail, wherein the fixed side transport motor is provided on a side surface of the fixed rail that faces the movable rail, the movable side transport motor is provided on a side surface of the movable rail that faces the fixed rail, and the fixed side transport motor and the movable side transport motor are arranged so as not to interfere with each other when the distance between the pair of transport rails is changed.

According to an aspect of the present invention, it may be possible to realize a component mounting apparatus, in which plural transport conveyor units are arranged in parallel, capable of improving insufficient driving torque of transport belts.

DETAILED DESCRIPTION

Figure 1:
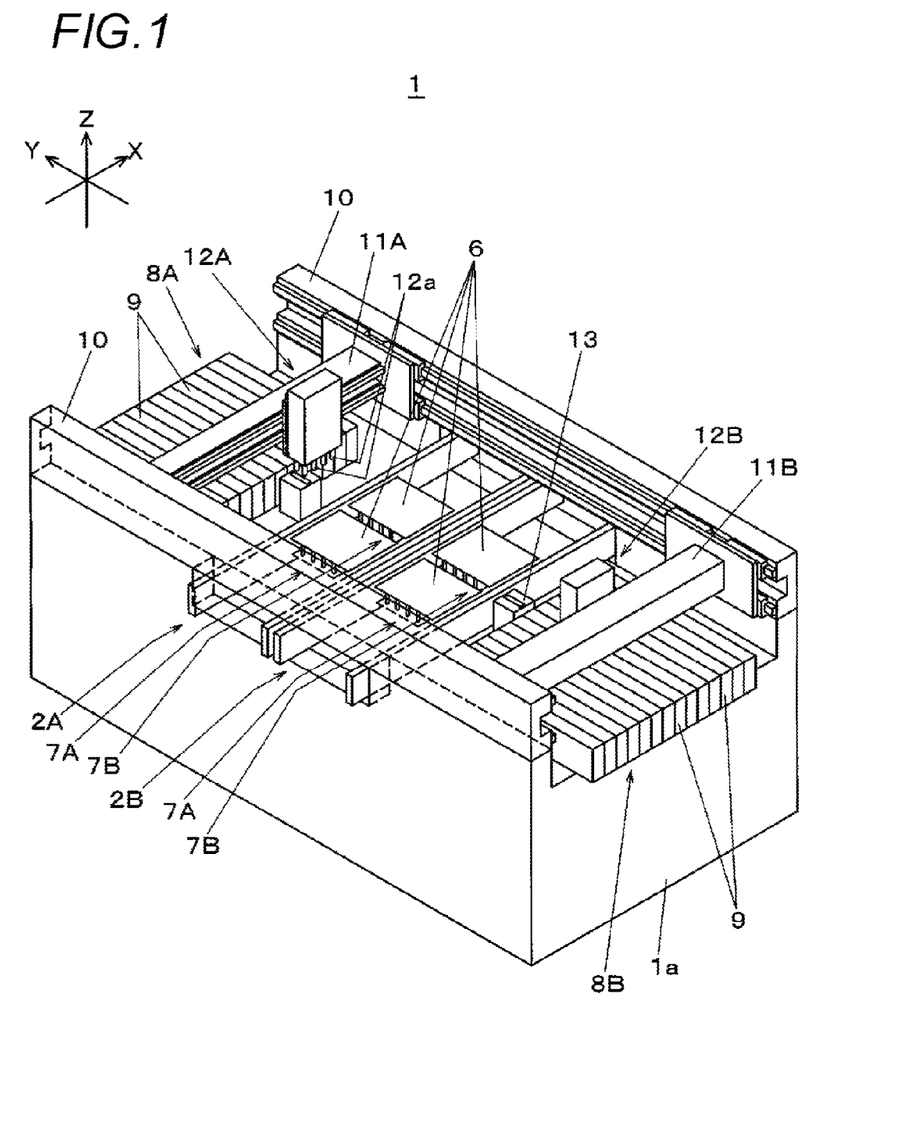
FIG. 1 is a perspective view of a component mounting apparatus according to an embodiment of the present invention.
Figure 2:
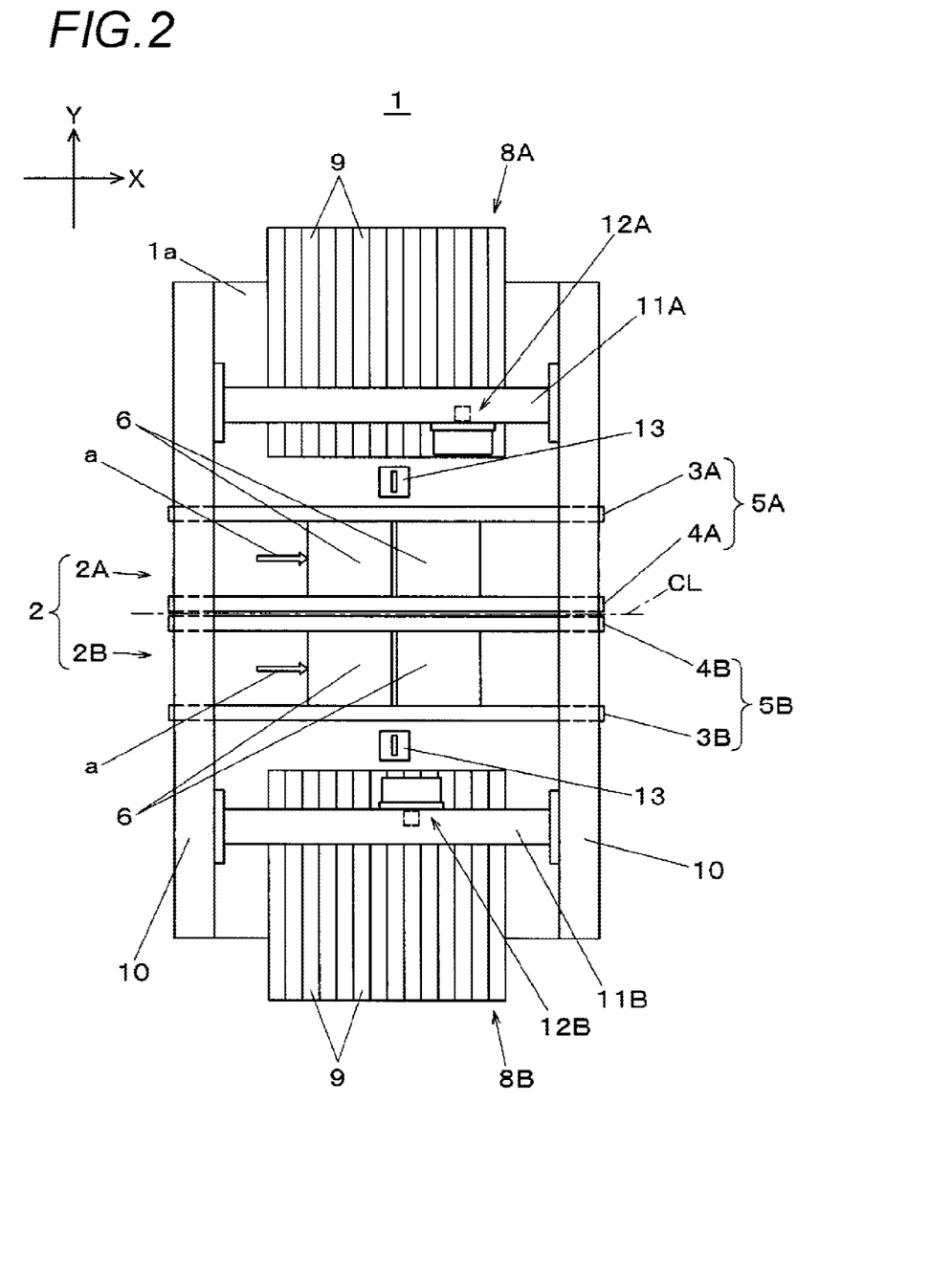
FIG. 2 is a plan view of a component mounting apparatus according to an embodiment of the present invention.

Hereinafter, an embodiment of the present invention will be described with reference to the accompanying drawings. First, a structure of a component mounting apparatus 1 will be described with reference to a perspective view of FIG. 1 and a plan view of FIG. 2. The component mounting apparatus 1 has a function of picking up a component from a component supply section using a component mounting mechanism in which a mounting head is provided, and mounting the component onto a board that is transported and positioned by a board transport mechanism. Hereinafter, a board transport direction of the board is defined as an X direction, a direction orthogonal to the X direction in the horizontal plane is defined as a Y direction, and a direction orthogonal to the horizontal plane, i.e., a vertical direction is defined as a Z direction.

In a central part of a base 1a, two transport conveyor units 2A and 2B that form a component transport mechanism 2 are adjacently arranged in parallel. The transport conveyor units 2A and 2B respectively include a pair of transport rails 5A and 5B that include fixed rails 3A and 3B and movable rails 4A and 4B. The fixed rails 3A and 3B are fixedly provided on outer sides of the transport conveyor units 2A and 2B that are adjacently arranged. The movable rails 4A and 4B are provided to be movable in the Y direction on inner sides of the transport conveyor units 2A and 2B that are adjacently arranged. The pair of transport rails 5A and 5B receives a board 6 which is a mounting target from an upstream side (see arrow a in FIG. 2), and transports the board 6 in the X direction to be positioned in a mounting operation area.

In the example shown herein, two boards 6 are positioned in the mounting operation areas of each of the transport conveyor units 2A and 2B. The positioned boards 6 are respectively supported by board support sections 7A and 7B on their bottom surfaces, and then, a component mounting operation is executed by a component mounting mechanism (which will be described later). Component supply sections 8A and 8B are respectively provided outside the transport conveyor units 2A and 2B, and plural tape feeders 9 are provided in parallel in the component supply sections 8A and 8B. The tape feeder 9 pitch-feeds a carrier tape that holds components which are mounting targets, and supplies the components to a component pickup position for the component mounting mechanism.

Y-axis beams 10 are respectively provided in opposite end parts of the base 1a in the X direction, and X-axis beams 11A and 11B are mounted on the Y-axis beams 10 to be movable in the Y direction. Further, mounting heads 12A and 12B are respectively mounted on the X-axis beams 11A and 11B to be movable in the X direction. Suction nozzles 12a that suction a component are provided in a lower end part of the mount heads 12A and 12B.

The Y-axis beams 10, the X-axis beams 11A and 11B, and the mounting heads 12A and 12B form the component mounting mechanism. As the component mounting mechanism is driven, two mounting heads 12A and 12B move in the horizontal direction, pick up components supplied to the component pickup positions by the tape feeders 9 using the suction nozzles 12a, and carry and mount the components onto the boards 6 positioned in the transport conveyor units 2A and 2B.

A component recognizing camera 13 is provided on each moving path where the mounting heads 12A and 12B move from the component supply sections 8A and 8B to the mounting operation areas of the transport conveyor units 2A and 2B. When the mounting heads 12A and 12B that suction and hold components move above the component recognizing cameras 13, the components held by the suction nozzles 12a are recognized by the component recognizing cameras 13. When the component mounting operation is performed by the component mounting mechanism, the component mounting operation of the board 6 is corrected based on a component recognition result obtained by the component recognizing camera 13.

Figure 3:
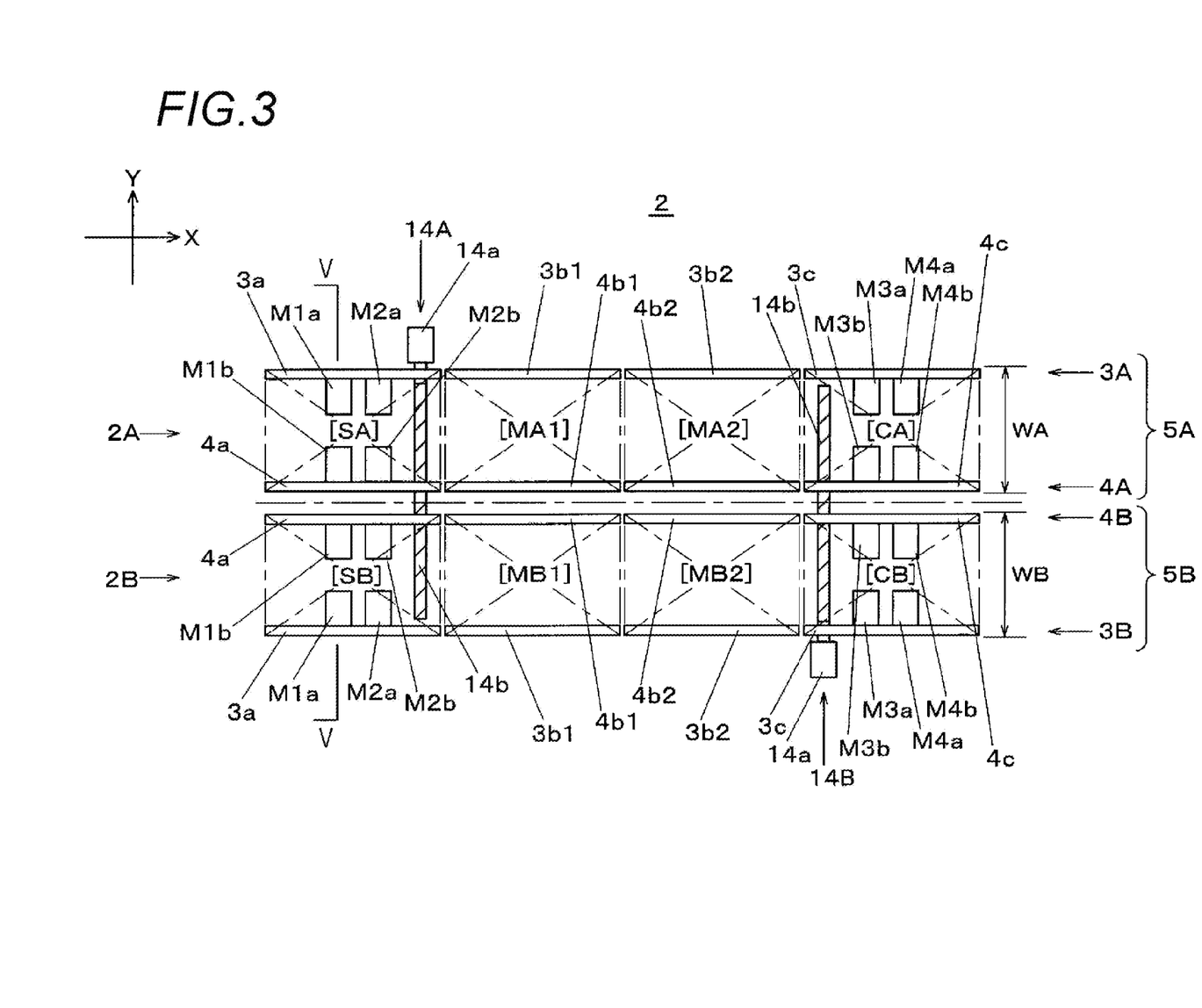
FIG. 3 is a plan view of transport conveyor units of a component mounting apparatus according to an embodiment of the present invention.
Figure 4:
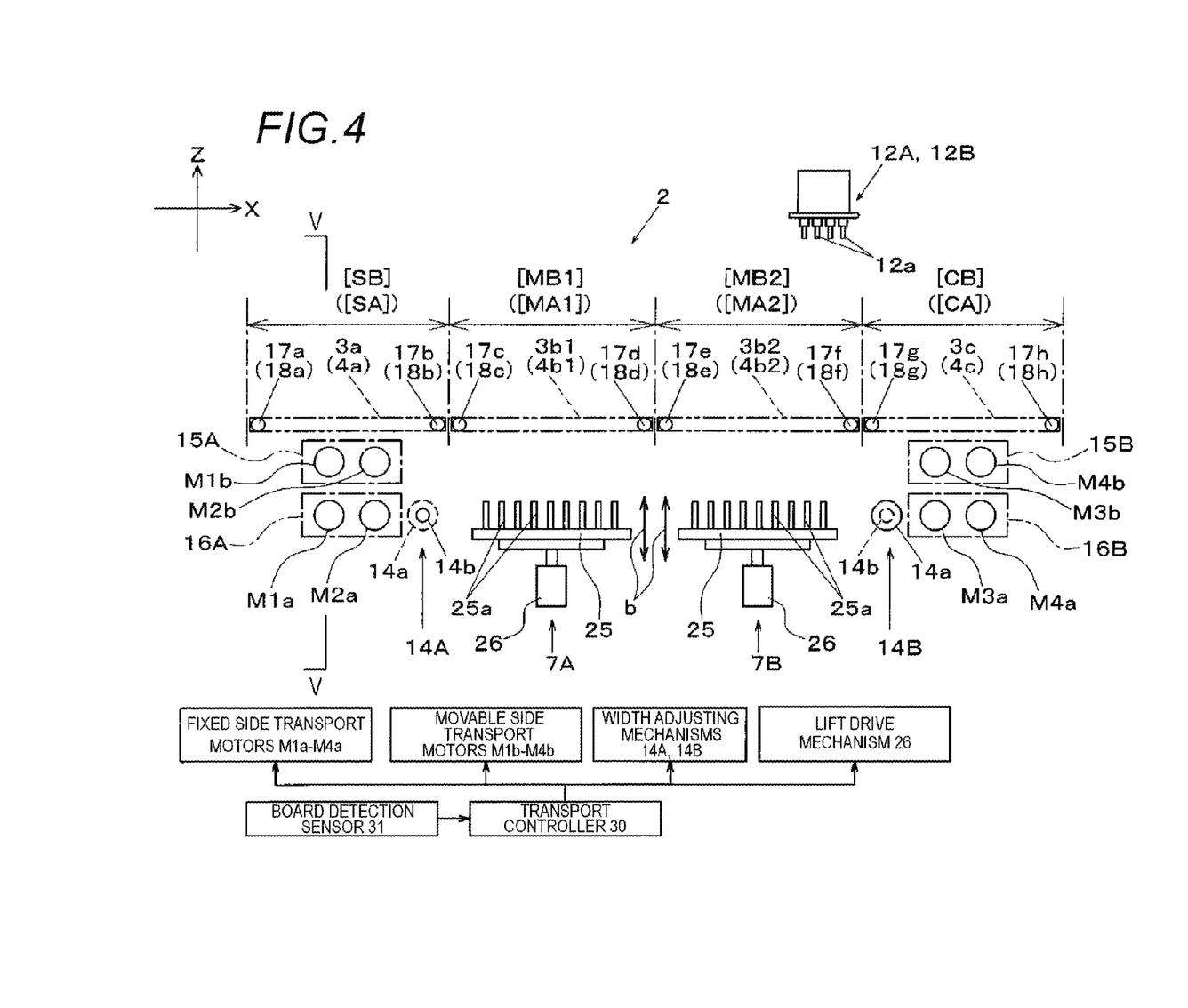
FIG. 4 is a diagram illustrating a configuration of transport conveyor units of a component mounting apparatus according to an embodiment of the present invention.
Figure 5:
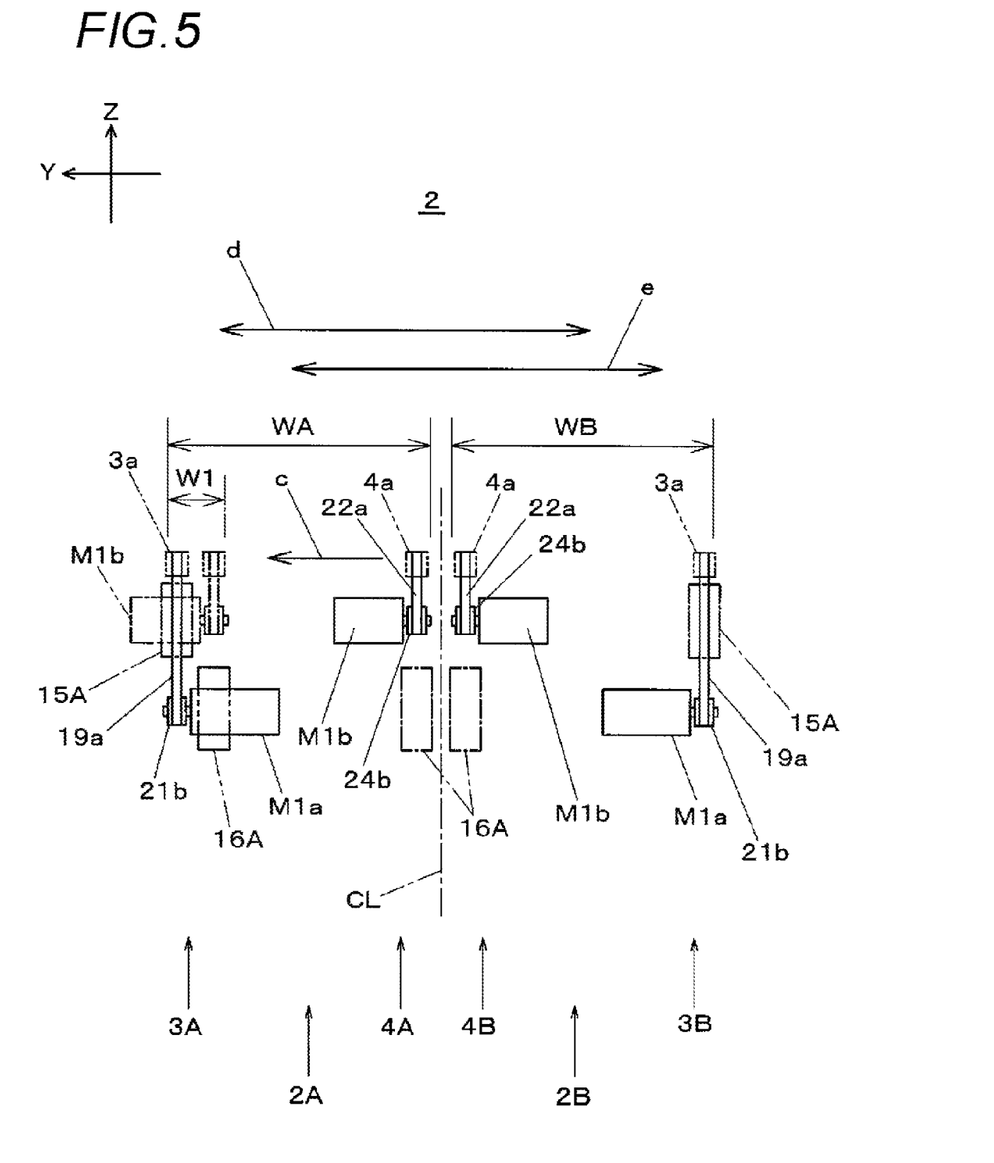
FIG. 5 is a diagram illustrating arrangement of a fixed side transport motor and a movable side transport motor of transport conveyor units of a component mounting apparatus according to an embodiment of the present invention.

A configuration of the board transport mechanism 2 will be described with reference to FIGS. 3 to 5. FIG. 3 is a plan view of the board transport mechanism 2 when seen from above, FIG. 4 illustrates a configuration of the board transport mechanism 2 when seen in the Y direction, and FIG. 5 shows a cross section taken along line V-V in FIGS. 3 and 4. In the transport conveyor units 2A and 2B, from the upstream side (left side in FIGS. 3 and 4), standby areas [SA] and [SB], upstream mounting areas [MA1] and [MB1], downstream mounting areas [MA2] and [MB2], and carry-out areas [CA] and [CB] are respectively set. The upstream mounting areas [MA1] and [MB1] and the downstream mounting areas [MA2] and [MB2] that are set at central positions in the transport direction correspond to the mounting operation areas where the boards 6 to be subjected to the component mounting operation by the component mounting mechanism are held.

The standby areas [SA] and [SB] that are provided respectively adjacent to upstream sides of the upstream mounting areas [MA1] and [MB1] are areas where the boards 6 carried from upstream apparatuses wait before entering the upstream mounting areas [MA1] and [MB1]. The carry-out areas [CA] and [CB] are areas from which the boards 6 respectively carried from the downstream mounting areas [MA2] and [MB2] are carried to downstream sides.

The two transport conveyor units 2A and 2B are adjacently arranged in parallel so that rear surfaces of the respective movable rails 4A and 4B face each other and the respective fixed rails 3A and 3B are disposed on the outer sides thereof. The fixed rails 3A and 3B and the movable rails 4A and 4B that form the transport conveyor units 2A and 2B are disposed along the X direction.

In the fixed rails 3A and 3B, fixed side carry-in conveyors 3a are provided corresponding to the standby areas [SA] and [SB], fixed side upstream mounting conveyors 3b1 and fixed side downstream mounting conveyors 3b2 are provided corresponding to the upstream mounting areas [MA1] and [MB1] and the downstream mounting areas [MA2] and [MB2], and fixed side carry-out conveyors 3c are provided corresponding to the carry-out areas [CA] and [CB].

Similarly, in the movable rails 4A and 4B, movable side carry-in conveyors 4a are provided corresponding to the standby areas [SA] and [SB], movable side upstream mounting conveyors 4b1 and movable side downstream mounting conveyors 4b2 are provided corresponding to the upstream mounting areas [MA1] and [MB1] and the downstream mounting areas [MA2] and [MB2], and movable side carry-out conveyors 4c are provided corresponding to the carry-out areas [CA] and [CB].

The fixed side carry-in conveyors 3a and the movable side carry-in conveyors 4a corresponding to the standby areas [SA] and [SB] are individually driven by fixed side transport motors M1a and movable side transport motors M1b. The fixed side upstream mounting conveyors 3b1 and the movable side upstream mounting conveyors 4b1 corresponding to the upstream mounting areas [MA1] and [MB1] are individually driven by fixed side transport motors M2a and movable side transport motors M2b.

The fixed side downstream mounting conveyors 3b2 and the movable side downstream mounting conveyors 4b2 corresponding to the downstream mounting areas [MA2] and [MB2] are individually driven by fixed side transport motors M3a and movable side transport motors M3b. The fixed side carry-out conveyors 3c and the movable side carry-out conveyors 4c corresponding to the carry-out areas [CA] and [CB] are individually driven by fixed side transport motors M4a and movable side transport motors M4b.

The fixed side transport motors M1a to M4a are respectively provided on side surfaces of the fixed rails 3A and 3B that face the movable rails 4A and 4B. Further, the movable side transport motors M1b to M4b are respectively provided on side surfaces of the movable rails 4A and 4B that face the fixed rails 3A and 3B. That is, the fixed side transport motors M1a to M4a and the movable side transport motors M1b to M4b are provided between the fixed rail 3A and the movable rail 4A and between the fixed rail 3B and the movable rail 4B. In other words, the movable side transport motors M1b to M4b are not provided between the movable rail 4A and the movable rail 4B, and thus, the transport conveyor unit 2A (movable rail 4A) and the transport conveyor unit 2B (movable rail 4B) can be adjacently disposed.

In the transport conveyor units 2A and 2B, since both the movable rails 4A and 4B are movable in the Y direction, transport widths WA and WB which are distances between the fixed rail 3A and the movable rail 4A, and between the fixed rail 3B and the movable rail 4B, that is, distances in the pair of transport rails 5A and 5B, are variable. The transport conveyor units 2A and 2B respectively include width adjusting mechanisms 14A and 14B having a linear motion mechanism that includes a width adjusting motor 14a and a feed screw 14b. When the inside movable rails 4A and 4B connected to the feed screws 14b are moved in the Y direction as the width adjusting motors 14a are driven, the transport widths WA and WB of the transport conveyor units 2A and 2B can be individually changed.

In the transport conveyor units 2A and 2B, the movable side transport motors M1b to M4b are respectively fixed to the movable rails 4A and 4B. Thus, the movable side transport motors M1b to M4b are moved in the Y direction integrally with the movable rails 4A and 4B when the distances between the fixed rails 3A and 3B and the movable rails 4A and 4B are changed.

Next, arrangement of the movable side transport motors M1b to M4b and the fixed side transport motors M1a to M4a will be described with respect to FIGS. 4 and 5. The movable side transport motors M1b and M2b are disposed at positions which are lower in height than the movable side carry-in conveyors 4a provided in the standby areas [SA] and [SB]. The movable side transport motors M3b and M4b are disposed at positions which are lower in height than the movable side carry-out conveyors 4c provided in the carry-out areas [CA] and [CB]. The fixed side transport motors M1a and M2a are disposed at positions which are lower in height than the movable side transport motors M1b and M2b. The fixed side transport motors M3a and M4a are disposed at positions which are lower in height than the movable side transport motors M3b and M4b.

In this way, the fixed side transport motors M1a to M4a and the movable side transport motors M1b to M4b are disposed at the positions that are shifted in the vertical direction. Thus, when the movable rails 4A and 4B are moved to change the transport widths WA and WB, the fixed side transport motors M1a to M4a and the movable side transport motors M1b to M4b do not interfere with each other. That is, the fixed side transport motors M1a to M4a and the movable side transport motors M1b to M4b are disposed at the position that are shifted in the vertical direction (in the Z direction) so as not to interfere with each other when the transport widths WA and WB which are the distances in the pair of transport rails 5A and 5B are changed. In this regard, the fixed side transport motors M1a to M4a and the movable side transport motors M1b to M4b may be disposed at positions that are shifted in the lateral direction (in the X direction) as long as the fixed side transport motors M1a to M4a and the movable side transport motors M1b to M4b do not interfere with each other.

Further, the fixed rails 3A and 3B include fixed side void spaces 15A and 15B in areas where the movable side transport motors M1b to M4b pass when the transport widths WA and WB are changed, in order to avoid the interference between the fixed rails 3A and 3B and the movable side transport motors M1b to M4b. Further, the movable rails 4A and 4B include movable side void spaces 16A and 16B in areas where the fixed side transport motors M1a to M4a pass when the transport widths WA and WB are changed, in order to avoid the interference with the fixed side transport motors M1a to M4a.

In this way, since the fixed side void spaces 15A and 15B and the movable side void spaces 16A and 16B are provided, when the transport widths WA and WB are changed, the fixed rails 3A and 3B and the movable side transport motors M1b to M4b do not interfere with each other, and the movable rails 4A and 4B and the fixed side transport motors M1a to M4a do not interfere with each other. Thus, the movable rail 4A may move outward (in an arrow c direction in FIG. 5) up to a position that is close to the fixed rail 3A. Similarly, the movable rail 4B may move outward up to a position that is close to the fixed rail 3B.

In FIG. 5, a state where the movable rail 4A of the transport conveyor unit 2A moves (in the arrow c direction) up to the position that is close to the fixed rail 3A is shown by a two dot chain line. In this state, the movable side transport motor M1b provided to the movable rail 4A passes through the fixed side void space 15A of the fixed rail 3A, and the fixed side transport motor M1a provided to the fixed rail 3A passes through the movable side void space 16A of the movable rail 4A. In this state, the distance between the movable rail 4A and the fixed rail 3A becomes a minimum width W1.

Each conveyor of the transport conveyor units 2A and 2B includes a transport belt that is horizontally laid between two pulleys and is driven by the transport motor. In FIG. 4, the fixed side carry-in conveyor 3a includes a fixed side transport belt between two pulleys 17a and 17b, the fixed side upstream mounting conveyor 3b1 includes a fixed side transport belt between two pulleys 17c and 17d, the fixed side downstream mounting conveyor 3b2 includes a fixed side transport belt between two pulleys 17e and 17f, and the fixed side carry-out conveyor 3c includes a fixed side transport belt between two pulleys 17g and 17h. Further, the movable side carry-in conveyor 4a includes a movable side transport belt between two pulleys 18a and 18b, the movable side upstream mounting conveyor 4b1 includes a movable side transport belt between two pulleys 18c and 18d, the movable side downstream mounting conveyor 4b2 includes a movable side transport belt between two pulleys 18e and 18f, and the movable side carry-out conveyor 4c includes a movable side transport belt between two pulleys 18g and 18h.

Here, configurations of the transport belts laid in the respective conveyors, the transport motors, and the pulleys will be described with reference to FIGS. 6A and 6B. First, the fixed side carry-in conveyor 3a and the fixed side upstream mounting conveyor 3b1 in the transport conveyor unit 2B will be described with reference to FIG. 6A. The fixed side carry-in conveyor 3a is configured so that a fixed side transport belt 19a is horizontally laid between two pulleys 17a and 17b and is guided to a drive pulley 21a of the fixed side transport motor M1a through plural pulleys 20a.

Further, the fixed side upstream mounting conveyor 3b1 is configured so that a fixed side transport belt 19b is horizontally laid between two pulleys 17c and 17d and is guided to a drive pulley 21b of the fixed side transport motor M2a through plural pulleys 20b. Further, the pulleys 20a and 20b are arranged so that the pulleys 20a and 20b and the fixed side transport belts 19a and 19b do not interfere with the fixed side void space 15A.

Next, the movable side carry-in conveyors 4a and the movable side upstream mounting conveyors 4b1 in the transport conveyor unit 2B will be described with reference to FIG. 6B. The movable side carry-in conveyor 4a is configured so that a movable side transport belt 22a is horizontally laid between two pulleys 18a and 18b and is guided to a drive pulley 24a of the movable side transport motor M1b through plural pulleys 23a.

Further, the movable side upstream mounting conveyor 4b1 is configured so that a movable side transport belt 22b is horizontally laid between two pulleys 18c and 18d and is guided to a drive pulley 24b of the movable side transport motor M2b through plural pulleys 23b. In addition, the pulleys 23a and 23b are arranged so that the pulleys 23a and 23b and the movable side transport belts 22a and 22b do not interfere with the movable side void space 16A.

Figure 6A:
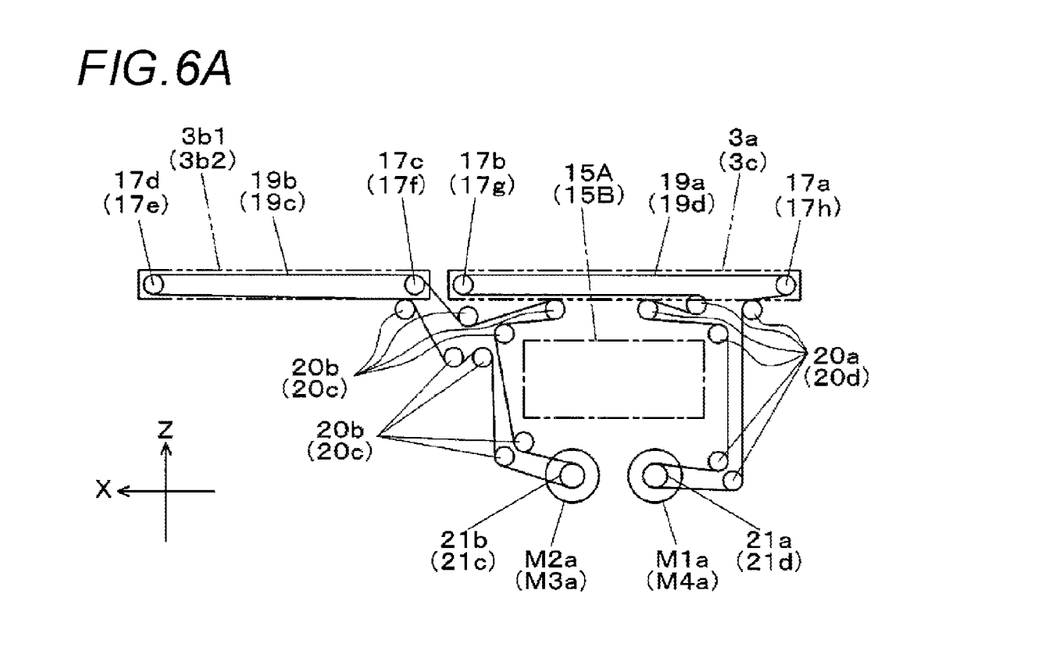
FIGS. 6A and 6B are diagrams illustrating a configuration of transport belts of transport conveyor units of a component mounting apparatus according to an embodiment of the present invention.
Figure 6B:
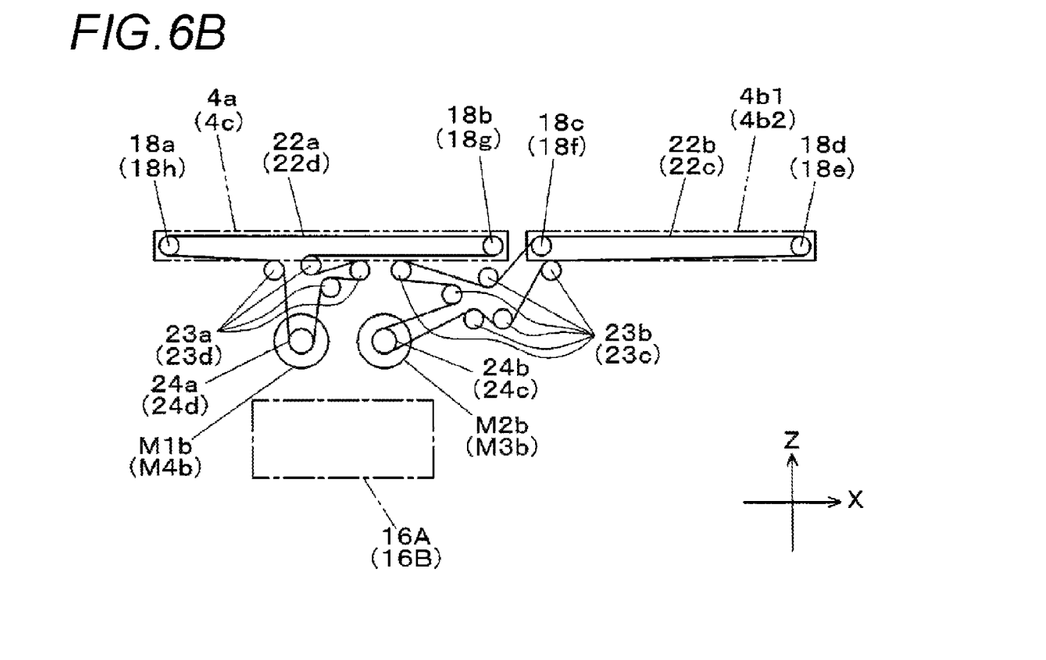

Configurations of the fixed side downstream mounting conveyor 3b2 and the fixed side carry-out conveyor 3c in the transport conveyor unit 2B have a symmetric relation of a mirror image with the fixed side upstream mounting conveyor 3b1 and the fixed side carry-in conveyor 3a with reference to the Z axis in FIG. 6A, and description thereof will not be repeated. Configurations of the movable side downstream mounting conveyor 4b2 and the movable side carry-out conveyor 4c in the transport conveyor unit 2B have a symmetric relation of a mirror image with the movable side upstream mounting conveyor 4b1 and the movable side carry-in conveyor 4a with reference to the Z axis in FIG. 6B, and description thereof will not be repeated.

Configurations of the respective conveyors in the transport conveyor unit 2A have a symmetric relation of a mirror image with the transport conveyor unit 2B with reference to the X-Z plane that passes through a apparatus center line CL, and description thereof will not be repeated. As described above, the transport conveyor units 2A and 2B include the fixed side transport motors M1a to M4a that drive the fixed side transport belts 19a to 19d provided in the fixed rails 3A and 3B, and the movable side transport motors M1b to M4b that drive the movable side transport belts 22a to 22d provided in the movable rails 4A and 4B.

Arrangements of the pulleys in the respective conveyors are not limited to the above-described examples. That is, the pulleys 20a to 20d of the fixed side carry-in conveyors 3a, the fixed side upstream mounting conveyors 3b1, the fixed side downstream mounting conveyors 3b2, and the fixed side carry-out conveyors 3c may be arranged in a different way as long as the pulleys 20a to 20d and the fixed side transport belts 19a to 19d do not interfere with the fixed side void spaces 15A and 15B. Further, the pulleys 23a to 23d of the movable side carry-in conveyors 4a, the movable side upstream mounting conveyors 4b1, the movable side downstream mounting conveyors 4b2, and the movable side carry-out conveyors 4c may be arranged in a different way as long as the pulleys 23a to 23d and the movable side transport belts 22a to 22d do not interfere with the fixed side void spaces 16A and 16B.

In FIG. 4, under the upstream mounting area [MA1] in the transport conveyor unit 2A and the upstream mounting area [MB1] in the transport conveyor unit 2B, the board support sections 7A are respectively provided. Under the downstream mounting area [MA2] in the transport conveyor unit 2A and the downstream mounting area [MB2] in the transport conveyor unit 2B, the board support sections 7B are respectively provided. The board support sections 7A and 7B are configured so that a support member 25 in which support pins 25a are vertically provided on an upper surface thereof is driven to move up and down (arrow b) by a lift drive mechanism 26. The board support sections 7A and 7B raise the board 6 which is a mounting target from a lower position to an operation height position by the support member 25 while supporting the board 6, when the mounting operation is performed by the mounting heads 12A and 12B.

In this way, under the upstream mounting areas [MA1] and [MB1] and the downstream mounting areas [MA2] and [MB2], since the board support section 7A and the board support section 7B are provided, it is difficult to dispose the fixed side transport motors M1a to M4a and the movable side transport motors M1b to M4b. Accordingly, the fixed side transport motors M1a to M4a and the movable side transport motors M1b to M4b are disposed under the standby areas [SA] and [SB] and the carry-out areas [CA] and [CB].

Further, the width adjusting mechanisms 14A and 14B in the transport conveyor units 2A and 2B are disposed at positions that do not interfere with the movable side transport motors M1b to M4b of the movable rails 4A and 4B that move in the Y direction and the support members 25 of the board support sections 7A and 7B that move up and down.

The rotational operations of the fixed side transport motors M1a to M4a and the movable side transport motors M1b to M4b, the movements of the movable rails 4A and 4B by means of the width adjusting mechanisms 14A and 14B, and the lift operations of the support members 25 by means of the lift drive mechanisms 26 of the board support sections 7A and 7B are respectively controlled by a transport controller 30. Further, board detection results from board detection sensors 31 that are respectively provided at board stop positions set in the vicinity of board carry-in ports of upstream ends of the upstream mounting areas [MA1] and [MB1] and the downstream mounting areas [MA2] and [MB2] and in the vicinity of downstream ends thereof are transmitted to the transport controller 30.

The transport controller 30 controls driving of the fixed side transport motors M1a to M4a and the movable side transport motors M1b to M4b based on the board detection results to individually position the boards 6 carried into the upstream mounting areas [MA1] and [MB1] and the downstream mounting areas [MA2] and [MB2] at the board stop positions. The positioning of the boards 6 at the board stop positions may be performed by the above-described method using the board detection sensors 31, or may be performed using mechanical positioning means for bringing the boards 6 into contact with mechanical stoppers for positioning.

Next, the change of the distance between the fixed rails 3A and 3B and the movable rails 4A and 4B, and the transport operation of the board 6 will be described with reference to FIG. 5. The transport controller 30 controls the width adjusting mechanisms 14A and 14B to respectively move the movable rails 4A and 4B to be movable in the Y direction, to thereby change the transport widths WA and WB in the transport conveyor units 2A and 2B. The transport controller 30 controls the fixed side transport motors M1a to M4a and the movable side transport motors M1b to M4b so as to individually move the boards 6 (not shown) to the transport conveyor units 2A and 2B.

Figure 7:
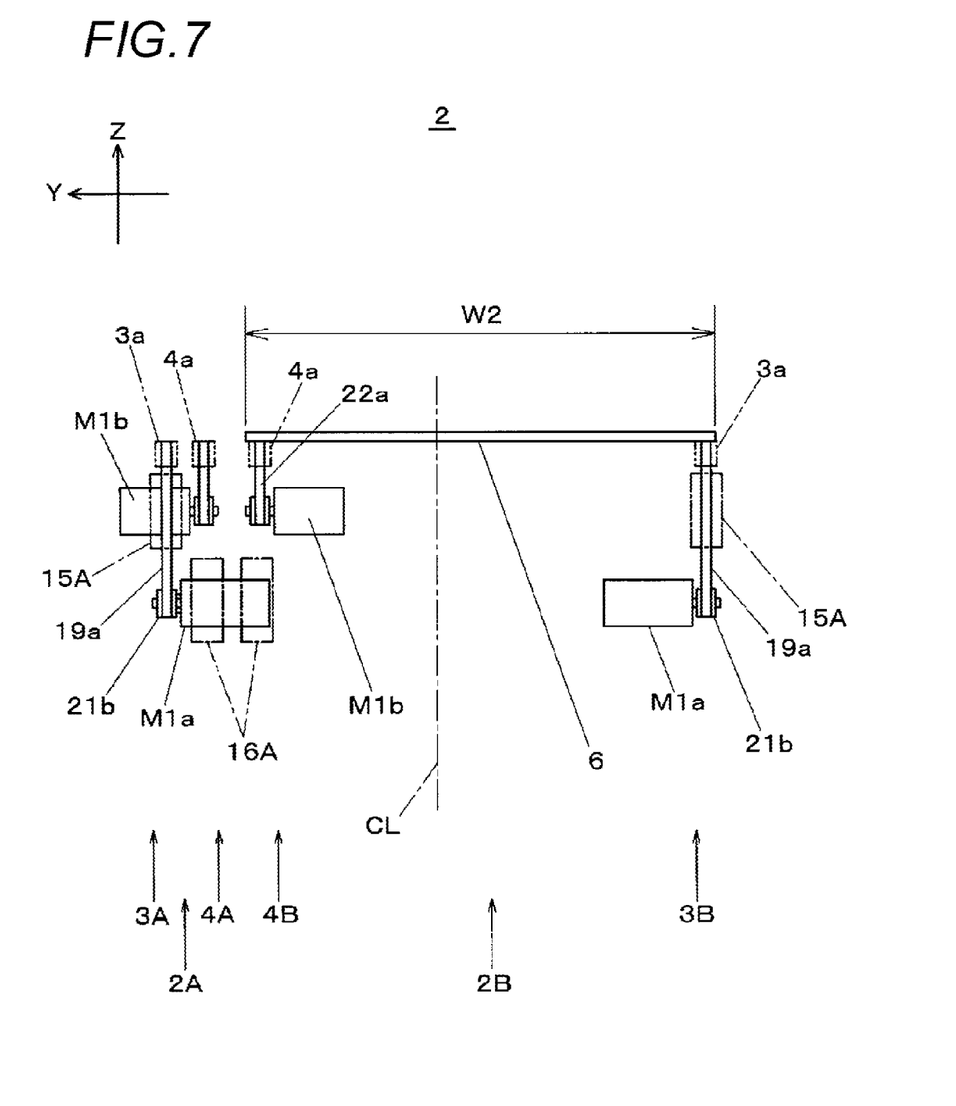
FIG. 7 is a diagram illustrating transport of a wide board in transport conveyor units of a component mounting apparatus according to an embodiment of the present invention.

Next, the transport operation of the wide board will be described with reference to FIG. 7. FIG. 7 shows a cross section taken along line V-V in FIGS. 3 and 4, which illustrates the board transport mechanism 2 that transports the board 6 having a transportable maximum width. In FIG. 7, the movable rail 4A moves to a position adjacent to the fixed rail 3A, and the movable rail 4B moves to a position adjacent to the movable rail 4A. Here, a distance between the movable rail 3B and the movable rail 4B in the transport conveyor unit 2B becomes a maximum width W2. In this state, the fixed rail 3A, the movable rails 4A and 4B, the fixed side transport motors M1a to M4a, and the movable side transport motors M1b to M4b do not interfere with each other due to the fixed side void spaces 15A and 15B and the movable side void spaces 16A and 16B.

In this state, the transport controller 30 controls the fixed side transport motors M1a to M4a and the movable side transport motors M1b to M4b so as to transport a wide board having the width W2 by the transport conveyor unit 2B. Here, the fixed side transport belts 19a to 19d of the fixed rail 3B are individually driven by the fixed side transport motors M1a to M4a, and the movable side transport belts 22a to 22d of the movable rail 4B are individually driven by the movable side transport motors M1b to M4b.

Thus, it is possible to perform transporting of a heavy object such as a transport carrier on which a thick and wide board or a flexible board is loaded, without the lack of driving torque of the transport belts.

As described above, in the transport conveyor units 2A and 2B of the component mounting apparatus 1 according to the embodiment of the present invention, the fixed side transport motors M1a to M4a that drive the fixed side transport belts 19a to 19d are provided between the fixed rail 3A and the movable rail 4A, and the movable side transport motors M1b to M4b that drive the movable side transport belts 22a to 22d are provided between the fixed rail 3B and the movable rail 4B. Further, the fixed side transport motors M1a to M4a and the movable side transport motors M1b to M4b are disposed at positions shifted in the vertical direction so as not to interfere with each other when the distances of the fixed rails 3A and 3B and the movable rails 4A and 4B are changed.

Further, the fixed rails 3A and 3B include the fixed side void spaces 15A and 15B created to avoid interference between the fixed rails 3A and 3B and the movable side transport motors M1b to M4b, and the movable rails 4A and 4B include the movable side void spaces 16A and 16B created to avoid interference between the movable rails 4A and 4B and the fixed side transport motors M1a to M4a. Thus, when the distances of the fixed rails 3A and 3B and the movable rails 4A and 4B are changed, the fixed rails 3A and 3B and the movable rails 4A and 4B do not interfere with each other. Further, the fixed side transport belts 19a to 19d and the movable side transport belts 22a to 22d are individually driven by the fixed side transport motors M1a to M4a and the movable side transport motors M1b to M4b, it is possible to improve insufficient driving torque.

According to the embodiment of the present invention, it may be possible to improve insufficient driving torque of transport belts, which is useful in a production field of a component mounted board.

What is claimed is:

1. A component mounting apparatus comprising:
   a plurality of transport conveyor units that are arranged in parallel and transports boards, each transport conveyer unit including a pair of transport rails of a fixed rail and a movable rail moving to change a distance between the pair of transport rails;
   a fixed side transport motor that drives a fixed side transport belt provide on the fixed rail; and
   a movable side transport motor that drives a movable side transport belt provide on the movable rail, wherein
   the fixed side transport motor is provided on a side surface of the fixed rail that faces the movable rail,
   the movable side transport motor is provided on a side surface of the movable rail that faces the fixed rail,
   the fixed side transport motor and the movable side transport motor are arranged so as not to interfere with each other when the distance between the pair of transport rails is changed, and
   one of the fixed side transport motor and the movable side transport motor is disposed at a position lower in height than another of the fixed side transport motor and the movable side transport motor.

2. The component mounting apparatus according to claim 1, wherein the fixed side transport motor is disposed at a position lower in height than the movable side transport motor so as not to interfere with each other when the distance between the pair of transport rails is changed.

3. The component mounting apparatus according to claim 1, wherein the fixed rail includes a fixed side void space created to avoid interference between the fixed rail and the movable side transport motor, and
   the movable rail includes a movable side void space created to avoid interference between the movable rail and the fixed side transport motor.

* * * * *